US009391663B2

(12) United States Patent
Yun et al.

(10) Patent No.: US 9,391,663 B2
(45) Date of Patent: Jul. 12, 2016

(54) FLIP COVER PLATE FOR MOBILE TERMINAL

(71) Applicants: Nam Woon Yun, Anyang-si (KR); Min Seok Yun, Anyang-si (KR); Nam Hee Lee, Anyang-si (KR)

(72) Inventors: Nam Woon Yun, Anyang-si (KR); Min Seok Yun, Anyang-si (KR); Nam Hee Lee, Anyang-si (KR)

(*) Notice: Subject to any disclaimer, the term of this patent is extended or adjusted under 35 U.S.C. 154(b) by 0 days.

(21) Appl. No.: 14/433,034

(22) PCT Filed: Dec. 11, 2013

(86) PCT No.: PCT/KR2013/011463
§ 371 (c)(1),
(2) Date: Apr. 1, 2015

(87) PCT Pub. No.: WO2015/016435
PCT Pub. Date: Feb. 5, 2015

(65) Prior Publication Data
US 2016/0142090 A1 May 19, 2016

(30) Foreign Application Priority Data

Aug. 2, 2013 (KR) .................. 10-2013-0091996
Sep. 6, 2013 (KR) .................. 10-2013-0107409

(51) Int. Cl.
H04M 1/00 (2006.01)
H04B 1/3888 (2015.01)
H04M 1/02 (2006.01)
(52) U.S. Cl.
CPC ........... *H04B 1/3888* (2013.01); *H04M 1/0202* (2013.01); *H04M 1/0214* (2013.01)
(58) Field of Classification Search
CPC .......... H04M 1/0214; H04M 2250/16; H04M 1/0283; H04M 1/0268

USPC .............. 455/575.8, 575.1, 347, 575.3, 90.3, 455/90.2, 566, 550.1, 73, 403, 422.1; 379/433.04, 428.01, 433.01, 433.13; 361/681, 679
See application file for complete search history.

(56) References Cited

FOREIGN PATENT DOCUMENTS

CN         2488234 Y   *  4/2002
JP      2007329697 A   * 12/2007
(Continued)

OTHER PUBLICATIONS
English Specification of 20-0467637.
(Continued)

*Primary Examiner* — Keith Ferguson
(74) *Attorney, Agent, or Firm* — Antonio Ha & U.S. Patent LLC

(57) ABSTRACT

The present invention relates to a flip cover plate (10) for a mobile terminal, the plate comprising: a cover plate inserted into a flip cover which opens and closes the front portion of the mobile terminal; and a transparent window coupled to one side of the cover plate and exposing a portion of a liquid crystal of the mobile terminal to the outside when the flip cover is positioned at the front portion of the mobile terminal, wherein the transparent window is configured to be bonded to at least one surface of the cover plate corresponding to in opening of the flip cover. Accordingly, the present invention has an advantage of maximizing productivity compared to production through one by one cutting processes by means of a conventional numerically controlled machine tool. Furthermore, since the transparent window is not simultaneously molded when the cover plate is injection-molded, the present invention has advantages of simplifying the shape of a mold, thereby being capable of reducing manufacturing costs, as well as reducing manufacturing time and also the failure rate of products since the manufacturing of parts proceeds in parallel.

14 Claims, 9 Drawing Sheets

(56) References Cited

FOREIGN PATENT DOCUMENTS

| | | |
|---|---|---|
| KR | 10-0942340 | 2/2010 |
| KR | 20-2010-0010008 | 10/2010 |
| KR | 20-2012-0005719 | 8/2012 |
| KR | 10-1192287 | 10/2012 |
| KR | 20-0467637 | 7/2013 |
| KR | 10-2013-0093046 | 8/2013 |

OTHER PUBLICATIONS

English Specification of 20-2010-0010008.
English Specification of 10-0942340.
English Specification of 10-1192287.
English Specification of 20-2012-0005719.
English Specification of 10-2013-0093046.

* cited by examiner

FLIP COVER PLATE FOR MOBILE TERMINAL

TECHNICAL FIELD

The present invention relates to a flip cover plate for a mobile terminal, in which an injection molding process, instead of conventional individual processing through a machine tool, is applied to a cover plate, and a transparent window is separately formed and attached to the cover plate, thus leading to reduced manufacture costs for flip cover plates, maximized productability, and increased product reliability.

DISCUSSION OF RELATED ART

As use of smartphones, such as the Galaxy™ or Iphone™, becomes more and more commonplace, various accessories for mobile phones are coming to market.

Among others, smartphones equipped with various functions are selling expensive, and accordingly, protective cases are gaining popularity to protect the phones.

Referring to FIG. 1, a protection case typically includes a case body 210 covering the rear and side surfaces of a mobile phone 100 thereof and a flip cover 220 rotatably coupled with the case body 210 at a side thereof to open and close the front surface of the mobile phone 100.

A cover plate 30 is placed inside the flip cover 220 to maintain the shape of the flip cover 220 and to protect the front surface 110 of the mobile phone 100.

Such cover plate has been conventionally manufactured by performing individual processing on a material, e.g., polycarbonate resin, using a machine tool, such as a numerically controlled (NC) machine.

As such, the manufacture of cover plate is done individually, i.e., unit-by-unit, resulting in low production efficiency and increased manufacture costs.

Further, such manufacturing process presents processing errors varying depending on the skills of the workers manipulating the machine tool, thus failing to allow finished products a constant level of reliability.

SUMMARY

To address the above issue, the applicant has proposed the technique that allows for mass production of protective case films, i.e., cover plates, in Korean Patent Application No. 2013-0060963 titled "MOBILE PHONE PROTECTION CASE FILM WITH TRANSPARENT PART AND METHOD FOR MANUFACTURING SAME."

Accordingly, the applicant has further enhanced his proposed method, and an object of the present invention is to provide a flip cover plate for a mobile terminal which is formed in a manner of attaching a transparent window onto a cover plate to remarkably reduce processing time and costs as compared with conventional numerically controlled machine tools and minimize defect rate by eliminating the likelihood that an errors occurs depending on the worker's skill, thus enhancing product reliability.

Another object of the present invention is to provide a flip cover plate for a mobile terminal with a transparent window formed using a separate hard coating film, presenting an enhanced surface hardness and strength, thus preventing damage that may occur upon the user's touch to provide more stable performance.

The above object is achieved by as flip cover plate for a mobile terminal according to an embodiment of the present invention, comprising: a cover plate inserted in a flip cover opening and closing a front surface of the mobile terminal; and a transparent window coupled at a side of the cover plate to externally expose part of a liquid crystal display of the mobile terminal while the flip cover is positioned on the front surface of the mobile terminal, wherein the transparent window is formed by attaching the same onto at least one surface of the cover plate corresponding to an opening of the flip cover.

Here, according to an embodiment of the present invention, the cover plate may have a seating hole where the transparent window is seated, and the transparent window may be formed by injection-molding a transparent material and is then attached at the seating hole.

In this case, the transparent window may have a bonding part around an edge thereof, and a bonding groove corresponding to the bonding part may be formed in the seating hole to guide the transparent window to be seated while the bonding part and the bonding groove, engaged with each other, are simultaneously bonded by an ultrasonic wave or heat.

Further, the transparent window may include as base film, an adhesive layer formed on a side surface of the base film, facing the cover plate, a hardness reinforcing coating layer formed on another side surface of the base film, and a protective film formed on the hardness reinforcing coating layer.

Or, according to another embodiment, the transparent window may be formed by wet-coating $SiO_2$ on a surface of the cover plate.

Or, according to still another embodiment, the transparent window may be formed by attaching as hard coating film on a surface of the cover plate using an OCA.

In this case, the transparent window may be formed by sequentially stacking and attaching the hard coating film and one or more reinforcing films on a surface of the cover plate.

In each embodiment above, the cover plate may be formed through an injection molding process.

Further, in each embodiment above, the base film may be formed of PET or PC.

Further, in each embodiment above, the transparent window is preferably formed to be coplanar with a surface of the flip cover.

Further, in each embodiment above, a reinforcing member may be further formed in the cover plate adjacent to the transparent window to prevent a local deformation due to a warp of the cover plate and to prevent the transparent window from escaping.

Here, the reinforcing member may be formed in the cover plate corresponding to each of both ends of the transparent window, and the reinforcing member may be formed of a reinforcing pin with a longitudinal direction in a direction in which the cover plate warps.

Further, the reinforcing pin may be inserted and fixed in the cover plate by thermal compression.

Further, in each embodiment above, the transparent window may contain a material with a dielectric constant to allow for a touch input while the flip cover is positioned on the front surface.

Accordingly, the present invention may remarkably reduce processing time and costs as compared with conventional numerically controlled machine tools and minimize defect rate by eliminating the likelihood that an errors occurs depending on the worker's skill, thus enhancing product reliability.

Accordingly, the present invention may maximize productability as compared with conventional methods of manufacturing products by performing individual cutting processes using a NC machine.

Further, upon injection of the cover plate, the transparent window is not simultaneously formed, and thus, the molds may be simplified in shape, thus reducing manufacture costs. Further, production of parts proceeds in parallel, leading to further shortened production time along with a decreased defect rate.

Further, a reinforcing member is provided on a side of the transparent window, preventing a deformation of the cover plate or detachment of the transparent window due to a warp.

Further, according to another embodiment of the present invention, the transparent window may be formed by attaching a hard coating film, thus leading to easier manufacture of the flip cover plate, reduced manufacture time and costs, and enhanced measurement accuracy, along with a reduced defect rate.

The transparent window may be formed using a separate hard coating film, presenting an enhanced surface hardness and strength and resultantly preventing damage that may occur upon the user's touch to provide more stable performance.

Further, the transparent window may be formed by sequentially stacking and attaching a hard coating film and a separate reinforcing film, thus reducing the slight deformation of the hard coating film that may occur when the user touches for manipulation to prevent damage to the hard coating film. Accordingly, further increased durability may be achieved.

DESCRIPTION OF EXEMPLARY EMBODIMENTS

Figure 1:
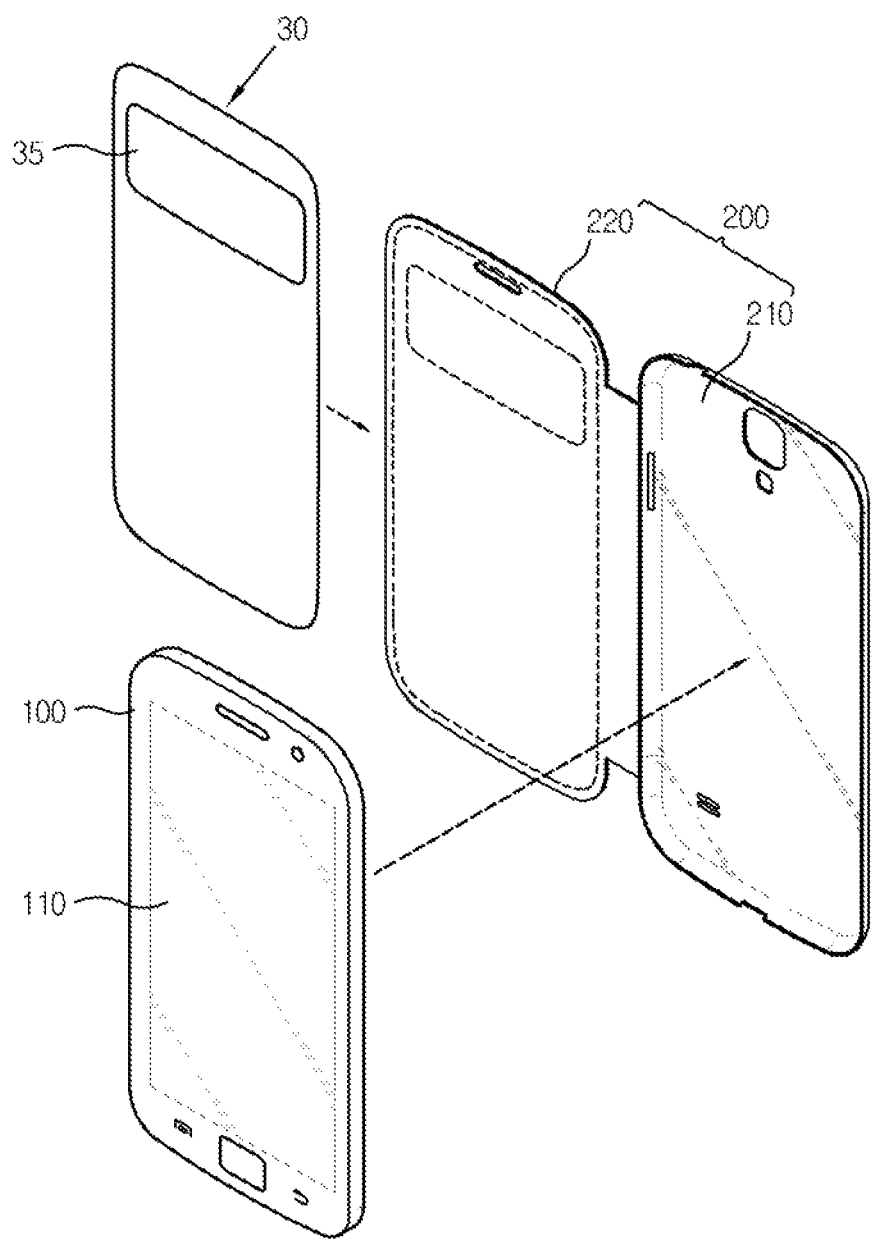
FIGS. 1 and 2 are views illustrating an example of putting in a flip cover plate for a mobile terminal according to an embodiment of the present invention.

Hereinafter, the present invention is described in detail with reference to the accompanying drawings.

According to the present invention, a tube connection part 10 for a mobile terminal includes a cover plate 30 inserted in a flip cover 220 opening and closing a front surface 110 of a mobile terminal 100 and a transparent window 35 coupled at a side of the cover plate 30 to partially expose the liquid crystal display (LCD) of the mobile terminal 100 while the flip cover 220 is positioned on the front surface of the mobile terminal 100. The transparent window 35 is formed in such a manner that the transparent window 35 is attached onto at least one surface of the cover plate 30 corresponding to an opening of the flip cover 220.

The transparent window 35 may be prepared by various methods, and each embodiment is hereinafter described in detail.

First Embodiment

According to the first embodiment of the present invention, in the flip cover plate 10 for a mobile terminal, the transparent window 35 is formed by performing an injection molding process on a transparent material, and is then attached to the cover plate 30.

The cover plate 30 is placed in the flip cover 220 opening and closing the front surface 110 of the mobile terminal 100, as shown in FIG. 1.

The flip cover 220 is rotatably coupled to the case body 210 coupled with the mobile terminal 100 at a rear surface and site surfaces thereof.

The cover plate 30 according to the present invention is preferably manufactured by an injection molding method as proposed in the Applicant's prior patent application, Korean Patent Application No. 2013-0060963.

Accordingly, as compared with conventional manufacturing methods using individual cutting through an NC machine, the present invention may maximize productability.

Further, unlike in the above-mentioned patent application, the transparent window 35 is not simultaneously formed upon injecting the cover plate 30, and thus, the molds may be simplified in shape, thus reducing manufacture costs and the defect rate of products.

The cover plate 30 may be formed of various materials, preferably polycarbonate (PC) or a light transmissive material obtained by mixing polycarbonate and a glass material.

A seating hole 31 guides the transparent window to be seated.

Figure 3:
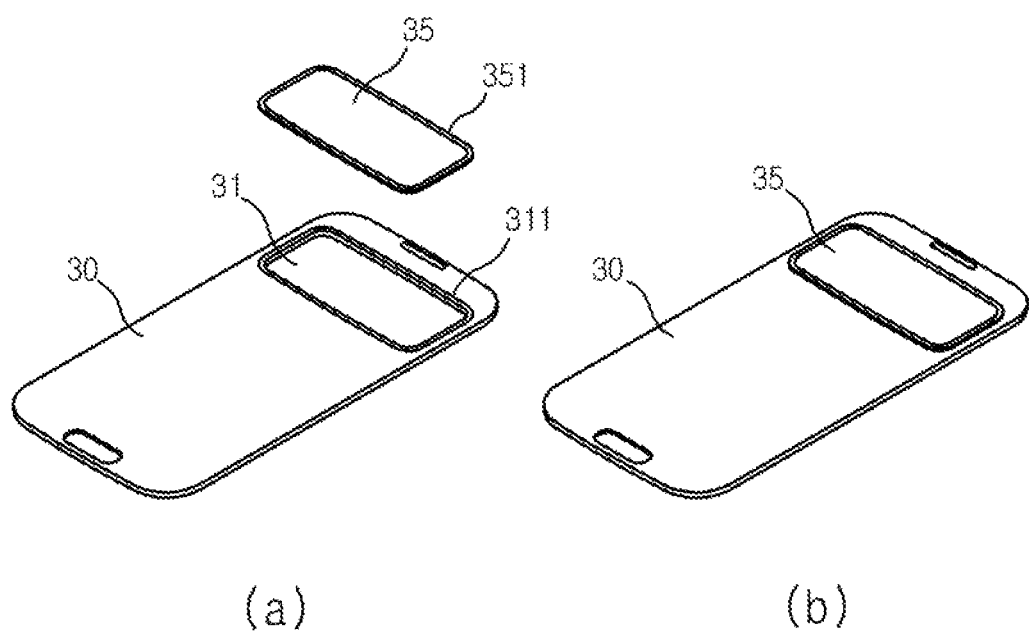
FIG. 3 is a perspective view illustrating a flip cover plate for a mobile terminal according to a first embodiment of the present invention.

The seating hole 31 is formed at a side of the cover plate 30 as shown in FIG. 3 and guides the coupling position of the transparent window 35.

The transparent window 35 is coupled at a side of the cover plate 30 to partially expose the LCD of the mobile terminal 100 to the outside while the flip cover 220 is positioned on the front surface 110 of the mobile terminal 100.

Figure 2:
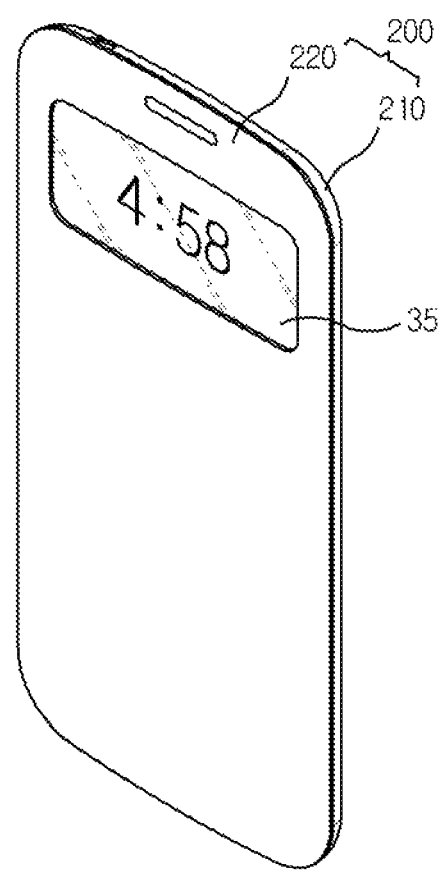

That is, as shown in FIG. 2, the transparent window 35 is configured to alloy the user to check time or information on callers even without opening the flip cover 220, thus maximizing user convenience.

Figure 4:
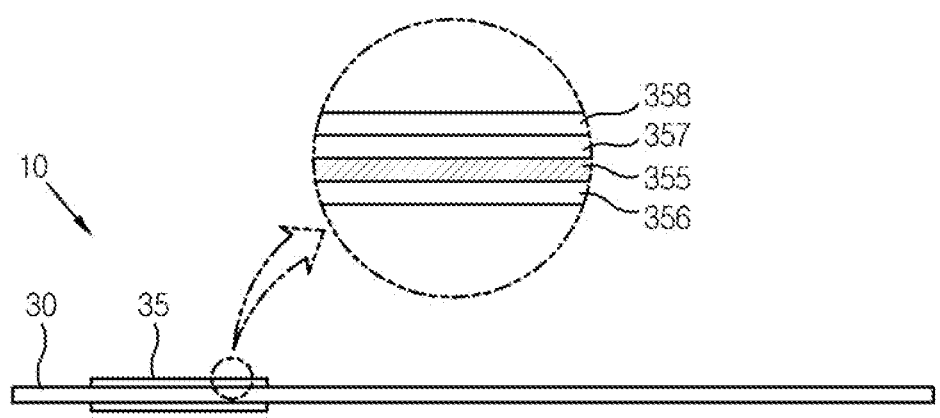
FIG. 4 is a cross-sectional view illustrating a flip cover plate for a mobile terminal according to a second embodiment of the present invention.

The transparent window 35 may be prepared in various manners. For example, as shown in FIG. 3, the transparent window 35 may be formed by injection molding and may be attached, or as shown in FIG. 4, the transparent window 35 may be formed by stacking multiple films and may be attached.

First, referring to FIG. 3, the transparent window 35 may be formed by performing injection molding on a transparent material.

The transparent window 35 may be formed of various materials, preferably an acrylic material for enhancing light transmittance.

The transparent window 35 may be attached to the cover plate 30 by various methods. For example, the transparent window 35 may be attached to the cover plate 30 by an adhesive or by an ultrasonic or thermal bonding.

According to the latter method, as shown in FIG. 3, a bonding part 351 may be formed around the edge of the transparent window 35, a bonding groove 311 may be formed in the seating hole 31, corresponding to the bonding part 351.

Accordingly, while the transparent window 35 is guided to be seated, the bonding part 351 and the bonding groove 311 engaged with each other may be bonded by heat or ultrasonic wave.

The following configuration is applied to not only the instant embodiment but also other embodiments to be described below without limitations, and accordingly, the description of the other embodiments is omitted.

Meanwhile, in each of the above embodiments, a reinforcing member 40 may be further formed in the cover plate 30 adjacent to the transparent window 35 to prevent the cover plate 30 from locally deforming due to a warp and to prevent the transparent window 35 from escaping.

Figure 5:
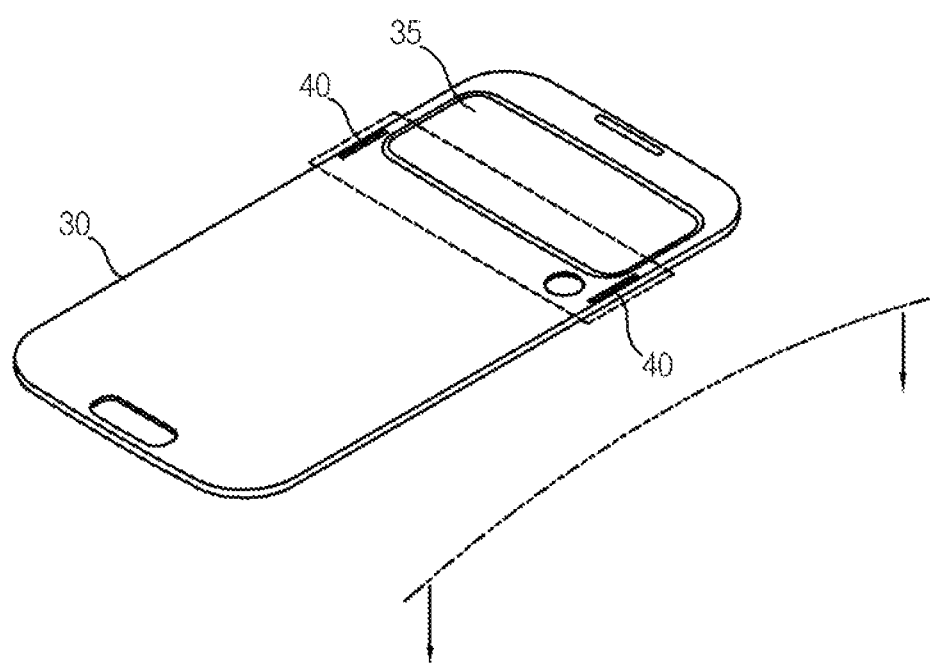
FIG. 5 is a cross-sectional view illustrating a flip cover plate for a mobile terminal according to an embodiment of the present invention.

That is, as shown in FIG. 5, in case the cover plate 30 is warped in the direction marked with the arrows, the stress concentrates around the transparent window 35 that is relatively thin.

This would not be a significant problem if the cover plate 30 and the transparent window 35 are formed as a single body. However, in case the cover plate 30 and the transparent window 35 are separated like in the instant invention, the flip cover 220 may remain deformed without turning back to its original shape, or the transparent window 35 may be spaced apart from the cover plate 30 causing a floating or separation.

However, the reinforcing member 40 formed as shown in FIG. 5 may prevent the cover plate 30 from remaining deformed or prevent the transparent window 35 from escaping.

Various types of reinforcing members 40 may be provided. For example, as shown in FIG. 5, reinforcing members 40 may be reinforcing pins that are respectively formed at both ends of the transparent window 35 and whose longitudinal direction corresponds to the direction in which the cover plate 30 is warped.

In such case, the reinforcing pins may be inserted and fixed in the rover plate 30 by thermal compression.

In each of the above embodiments, the transparent window may contain a material with a dielectric constant to allow for a touch input while the flip cover is positioned on the front surface.

Second Embodiment

According to the second embodiment of the present invention, in the flip cover plate 10 for a mobile terminal, the transparent window 35 is formed by stacking multiple films including a base film 355.

That is, according to this embodiment, the transparent window 35 may be provided with multiple film layers and may be attached onto the cover plate 30. For example, as shown in FIG. 4, the transparent window 35 may include the base film 355, an adhesive layer 356 formed on a side surface of the base film 355, facing the cover plate 30, a hardness reinforcing coating layer 357 formed on the other side surface of the base film 355, and a protective film 358 formed on the hardness reinforcing coating layer 357.

Here, the base film 355 may be formed of polyethylene terephthalate (PET), and the adhesive layer 356 may be formed of an optically clear adhesive (OCA).

Third Embodiment

According to the third embodiment of the present invention, in the flip cover plate 10 for a mobile terminal, the transparent window 35 is attached on to surface of the cover plate 30 by a hard coating film 359.

That is, according to this embodiment, a case 200 includes a case body 210 covering a rear surface and sick surfaces of the mobile terminal 100, a flip cover 220 rotatably provided on a side of the case body 210 to open and close the front surface 110 of the mobile terminal 100, and a cover plate 30 inserted in the flip cover 220.

The case body 210 is formed to have an opening at a surface thereof to provide a space for accommodating the mobile terminal 100, and the flip cover 220 is coupled to the case body 210 via a soft material to be rotatable. The flip cover 220 rotates about the case body 210 to open and close the front surface 110 of the mobile terminal 100 accommodated in the case body 210. That is, the flip cover 220 externally exposes or blocks and protects the front surface of the mobile terminal 100 from the outside.

The flip cover 220 rotates to block the front surface 110 of the mobile terminal 100 from the outside and contacts the front surface 110 of the mobile terminal 100. Accordingly, the flip cover 220 is formed of as soft material not to damage the touch panel and display screen formed on the front surface 110 of the mobile terminal 100. Thus, the plate-shaped cover plate 30 is placed in the flip cover 220 to allow the structure a strength.

Figure 6:
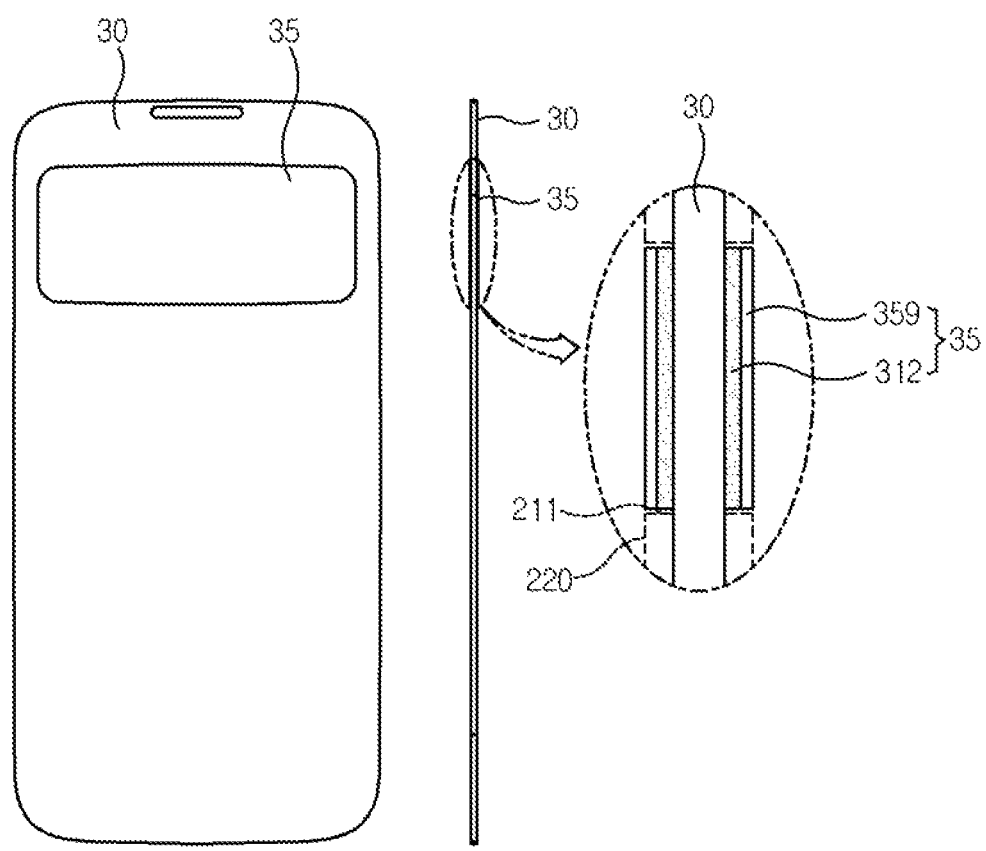
FIG. 6 is a view schematically illustrating the shape of an inner film of a mobile phone case according to a third embodiment of the present invention.

Meanwhile, the flip cover 220 has an opening 211 at a side thereof, allowing part of the display screen formed on the front surface 110 of the mobile terminal 100 to be viewed from outside, and the transparent window 35 is formed in the cover plate 30 to be externally exposed through the opening 211. In this case, it is preferable that when the flip cover 220 rotates to contact the front surface 110 of the mobile terminal 100, the inner surface of the transparent window 35 comes in contact with the front surface 110 of the mobile terminal 100, and thus, the transparent window 35 is formed coplanar with the surface of the flip cover 220 as shown in FIG. 6. In other words, the transparent window 35 is formed on the surface of the cover plate 30 at the same thickness as a height of the case surface so that no step may be formed between the region where the opening 211 is formed and the surface of the flip cover 220. Accordingly, it is preferable to form the transparent window 35 on each of both surfaces of the cover plate 30 from a perspective of arrangement. Of course, as necessary, the transparent window 35 may be formed only on one surface of the cover plate 30.

The transparent window 35 is formed to allow the display screen formed on the front surface 110 of the mobile terminal 100 to be viewed from outside as well as to allow the front surface 110 of the mobile terminal 100 to be manipulated by touching. For example, as shown in FIG. 2, the user may check, with his naked eyes, time displayed on the front surface 110 of the mobile terminal 100 through the transparent window 35, and if there is an incoming call, the user may manipulate the mobile terminal 100 by touching the front surface 110 the mobile terminal 100 through the transparent window 35, so that be can start to talk on the phone even without rotating and opening the flip cover 220. Accordingly, the transparent window 35 is formed of a transparent material with a dielectric constant so as to conduct such two functions both. Of course, this may be applicable to the above embodiments.

In this case, according to the instant embodiment, the transparent window 35 is by attaching the hard coating film 359 on the surface of the cover plate 30.

In other words, a typical cover plate 30 is formed integrally with a transparent window 35 with a relatively large thickness by, e.g., a cutting process using CNC processing as described above in the Related art section. In contrast, however, the transparent window 35 according to an embodiment of the present invention is formed in a way to attach a separate hard coating film 359 onto the surface of the flat cover plate 30, unlike in the conventional art, thus reducing manufacture time and costs and significantly decreasing defect rate.

Further, according to this embodiment, the cover plate 3 may be formed by performing an injection molding process on a resin material, such as PET or PC. Such manufacturing process of forming the cover plate 30 by injection molding, not CNC processing, may enhance measurement accuracy of the cover plate 30 while remarkably reducing manufacture time and costs.

Meanwhile, if the cover plate 30 is injection-molded using a resin material, the transparent window 35 may also be formed integrally in the course of injection folding. In such case, since the transparent window 35 is formed of a resin material like the cover plate 30, it, by the nature of the material, ends up with low strength and hardness, and thus, the transparent window 35 may be damaged upon the user's touch and manipulation.

In this embodiment, the transparent window 35 is formed in a manner to attach the hard coating film 359 onto the surface of the cover plate 30, allowing the transparent window 35 an increased strength and hardness.

In this case, the hard coating film 359 of the transparent window 35 may be formed by coating a material with a high strength and hardness onto a surface of the base film 355. Preferably, an organic material, such as a silicon- or fluorine-based resin, or inorganic material may be coated onto a surface of the base film. For example, the transparent window 35 may be formed by wet-coating silicon dioxide ($SiO_2$) onto a surface of the base film formed of PET or PC, or the transparent window 35 may be formed by vacuum depositing an inorganic material, such as $MgF_2$, zirconium dioxide ($ZrO_2$), or cesium fluoride ($CeF_4$), onto a surface of the base layer. Such wet coating or vacuum depositing is a widely used technique, and no further description thereof is given.

More preferably, silicon dioxide ($SiO_2$) may be vacuum-deposited on an outer surface of the hard coating film 359 which is frequently contacted by the user's hand to prevent the user's fingerprints to be left on the transparent window 35.

Meanwhile, the transparent window 35 may be formed by attaching the hard coating film 359 on the surface of the cover plate 30 using an optically clear adhesive (OCA) 312. The transparent window 35 should remain light-transmissive to allow the front surface 110 of the mobile terminal 100 to be viewed from outside. Accordingly, it is preferable to use as transparent adhesive, such as OCA, when attaching the hard coating film 359.

Figure 7:
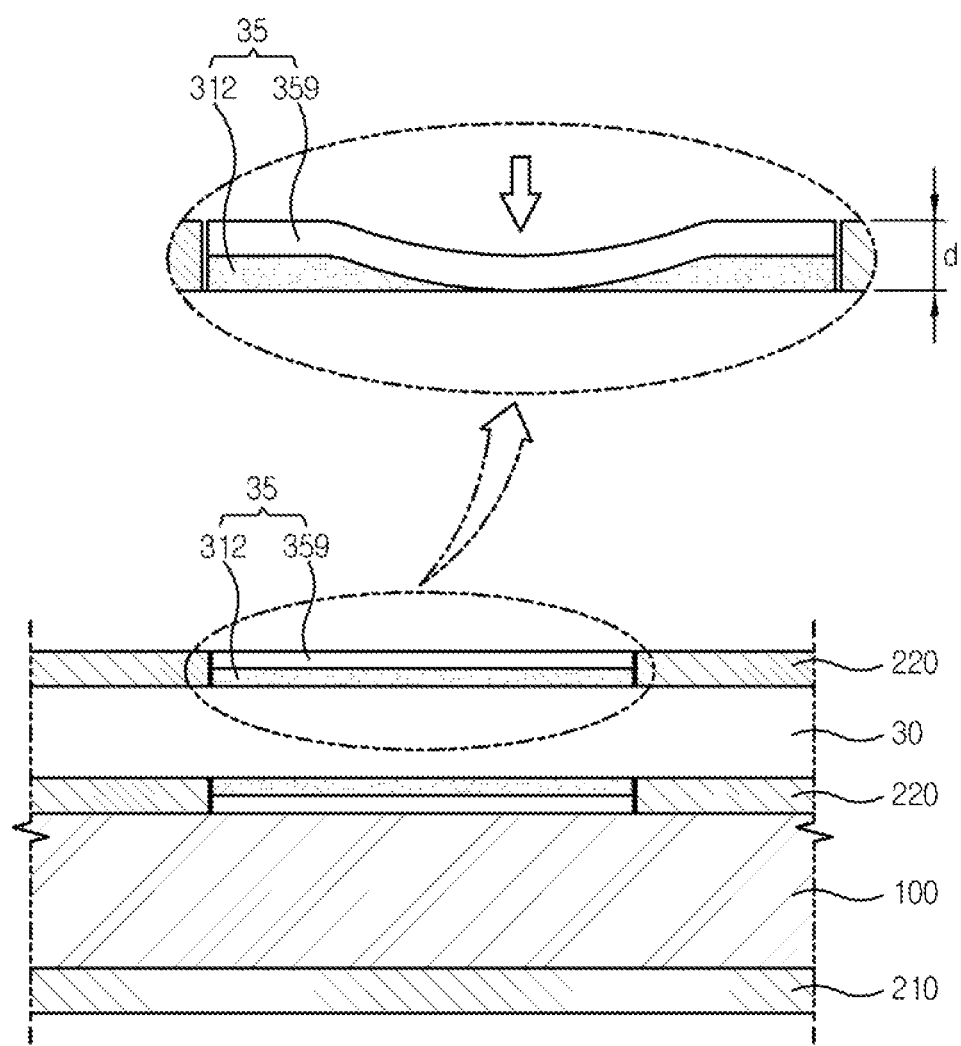
FIGS. 7 and 8 are magnified views each illustrating the structure of a transparent touch part of an inner plate according to the third embodiment of the present invention.

By such structure, the transparent window 35 is formed with the OCA 312 and the hard coating film 359 stacked one over the other at thickness d to allow itself to be coplanar with the surface of the flip cover 220 as shown in FIG. 7.

In such case, when the user touches and pressures the transparent window 35 for manipulation, the hard coating film 359 may be slightly bent or deformed around the touched portion and so damaged because of the nature of the OCA 312 relatively soft.

Figure 8:
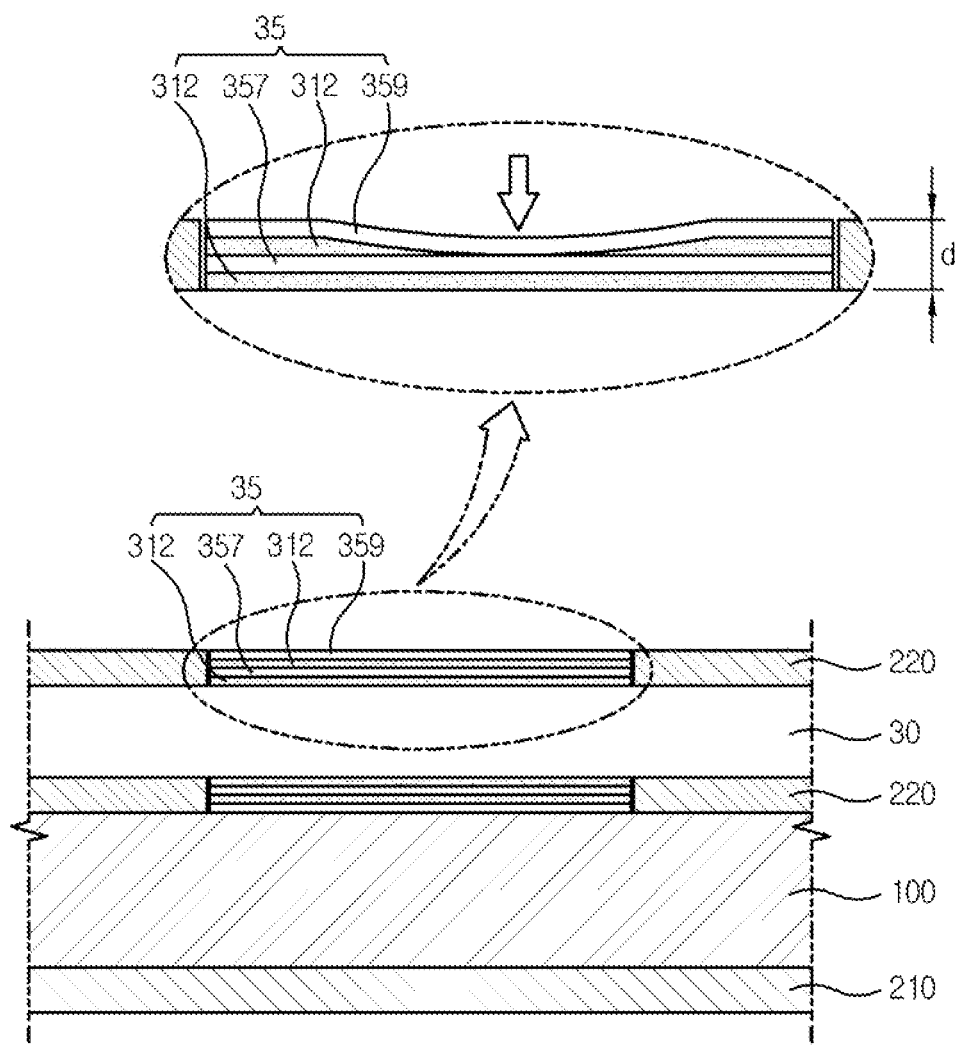

To prevent such damage to the hard coating film 359, a reinforcing film 313 may be formed between the hard coating film 359 of the transparent window 35 and the cover plate 30 as shown in FIG. 8, according to an embodiment of the present invention. In this case, the reinforcing film 313 is preferably formed of a transparent material, such as PET or PC.

That is, the transparent window 35 may be formed by sequentially stacking and attaching the reinforcing film 313 and the protective film 358 separately on a surface of the cover plate 30.

For example, the separate reinforcing film 313 may be attached onto a surface of the cover plate 30 using a transparent adhesive, the OCA 312, and then, the hard coating film 359 may be attached onto a surface of the reinforcing film 313 using the OCA 312.

In this case, although not shown, a plurality of reinforcing films 313 may be stacked and attached using the OCA 312.

As such it is preferable to leave the transparent window 35 at thickness d, as described above in connection with FIG. 4, even when forming the transparent window 35 by sequentially stacking and attaching the reinforcing film 313 and the hard coating film 359 on a surface of the cover plate 30. In such case, although the user touches the transparent window 35 for manipulation or pressurizes the outer surface of the hard coating film 359, since the OCA layer 312 is relatively thin, the degree of deformation of the hard coating film 359 around the pressurized portion is relatively reduced as compared with the case illustrated in FIG. 8. Further, from the stack structure of the 357 and die hard coating film 359, the hard coating film 359 is backed up in strength by the reinforcing film 313, and the degree of deformation of the hard coating film 359 is relatively reduced. Accordingly, the transparent window 35 of such structure may prevent damage to the hard coating film 359, leading to further increased durability.

According to the instant embodiment, at least one of the cover plate 30, the hard coating film 359, and the reinforcing film 313 may be mixed with paint with a color, allowing the transparent window 35 a predetermined color to meet the user's preference.

Figure 9:
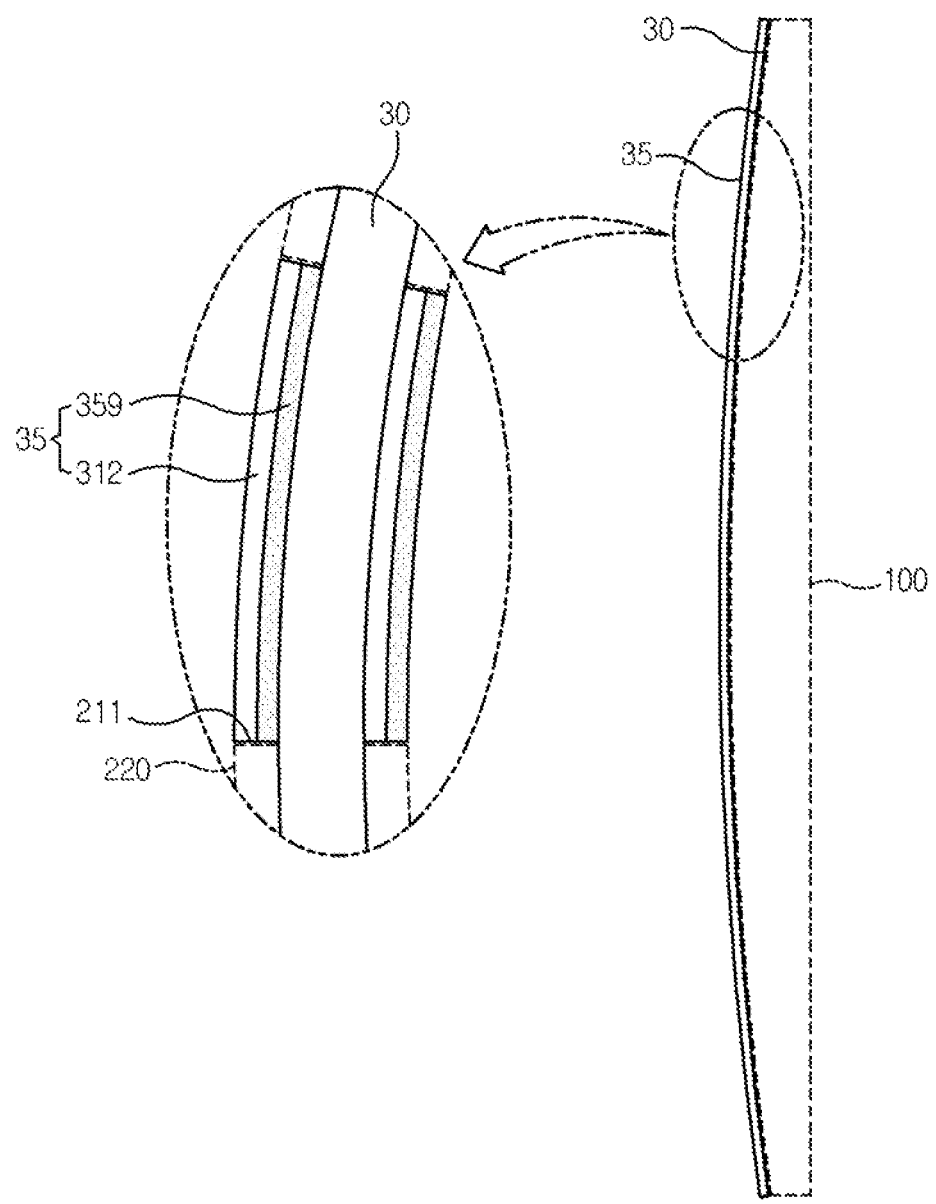
FIG. 9 is a magnified view illustrating the structure of a transparent touch part according to another embodiment of the present invention.

Meanwhile, with the development of display technology, the front surface 110 of the mobile terminal 100 may come in curved shape. As such, when the front surface 110 of the mobile terminal 100 is curved, the flip cover 220 of the dust filter 200 should be formed curved as well. Accordingly, the cover plate 30 and the transparent window 35 placed in the flip cover 220 are also formed to have a curved surface as shown in FIG. 9. In such case, if the inner film and transparent touch part are subjected to CNC processing as in the prior art, the transparent touch part with the same curved surface as the inner film is difficult to cutting-process, and thus, the defect rate is increased.

According to an embodiment of the present invention, the cover plate 30 may be easily formed through an injection molding process to have a curved surface, and the transparent window 35 may be formed by simply attaching the hard coating film 359 onto the curved cover plate 30. Accordingly, a curved cover plate 30 and transparent window 35 may be easily manufactured.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A flip cover plate for a mobile terminal, comprising: a cover plate inserted in a flip cover opening and closing a front surface of the mobile terminal; and a transparent window coupled at a side of the cover plate to externally expose part of a liquid crystal display of the mobile terminal while the flip cover is positioned on the front surface of the mobile terminal, wherein the transparent window is formed by attaching the same onto at least one surface of the cover plate corresponding to an opening of the flip cover.

2. The flip cover plate of claim 1, wherein the cover plate has a seating hole where the transparent window is seated, and wherein the transparent window is formed by injection-molding a transparent material and is then attached to the seating hole.

3. The flip cover plate of claim 2, wherein the transparent window has a bonding part around an edge thereof, wherein a bonding groove corresponding to the bonding part is formed in the seating hole to guide the transparent window to be seated while the bonding part and the bonding groove, engaged with each other, are simultaneously bonded by an ultrasonic wave or heat.

4. The flip cover plate of claim 1, wherein the transparent window includes a base film, an adhesive layer formed on a side surface of the base film, Facing the cover plate, a hardness reinforcing coating layer formed on another side surface of the base film, and a protective film formed on the hardness reinforcing coating layer.

5. The flip cover plate of claim 1, wherein the transparent window is formed by wet-coating $SiO_2$ on a surface of the cover plate.

6. The flip cover plate of claim 1, wherein the transparent window is formed by attaching a hard coating film on a surface of the cover plate using an OCA.

7. The flip cover plate of claim 6, wherein the transparent window is formed by sequentially stacking and attaching the hard coating film and one or more reinforcing films on a surface of the cover plate.

8. The flip cover plate of claim 1, wherein the cover plate is formed through an injection molding process.

9. The flip cover plate of claim 1, wherein the base film is formed of PET or PC.

10. The flip cover plate of claim 1, wherein the transparent window is formed to be coplanar with a surface of the flip cover.

11. The flip cover plate of claim 1, wherein a reinforcing member is further formed in the cover plate adjacent to the transparent window to prevent a local deformation due to a warp of the cover plate and to prevent the transparent window from escaping.

12. The flip cover plate of claim 11, wherein the reinforcing member is formed in the cover plate corresponding to each of both ends of the transparent window, and wherein the reinforcing member is formed of a reinforcing pin with a longitudinal direction in a direction in which the cover plate warps.

13. The flip cover plate of claim 12, wherein the reinforcing pin is inserted and fixed in the cover plate by thermal compression.

14. The flip cover plate of claim 1, wherein the transparent window includes a material with a dielectric constant to allow for a touch input while the flip cover is positioned on the front surface.

* * * * *